United States Patent [19]

Beakes et al.

[11] Patent Number: 5,549,253

[45] Date of Patent: Aug. 27, 1996

[54] STATOR WINDING APPARATUS

[75] Inventors: John M. Beakes, Fairborn; Gary E. Clemenz, Bellbrook; Patrick A. Dolgas, Milford; Mark T. Heaton, Springfield; Lawrence E. Newman, Tipp City, all of Ohio

[73] Assignee: Globe Products Inc., Huber Heights, Ohio

[21] Appl. No.: 349,410

[22] Filed: Dec. 5, 1994

Related U.S. Application Data

[62] Division of Ser. No. 148,175, Nov. 5, 1993, Pat. No. 5,370,324, which is a continuation of Ser. No. 587,937, Sep. 25, 1990, abandoned.

[51] Int. Cl.$^6$ .................................................. H02K 15/02
[52] U.S. Cl. ................................ 242/432.3; 242/432.6
[58] Field of Search .......................... 242/1.1 R, 1.1 A, 242/1.1 E; 29/596, 605

[56] References Cited

U.S. PATENT DOCUMENTS

| | | | |
|---|---|---|---|
| 3,580,090 | 5/1971 | Bondarenko | 242/1.1 R |
| 3,648,938 | 3/1972 | Dryburgh . | |
| 3,812,570 | 5/1974 | Mason | 29/205 D |
| 3,881,238 | 5/1975 | Mason | 29/205 D |
| 3,903,593 | 9/1975 | Mason | 242/1.1 R |
| 4,000,764 | 1/1977 | Reiger, Jr. | 140/113 |
| 4,074,418 | 2/1978 | Pearsall | 29/596 |
| 4,158,314 | 6/1979 | Finegold | 74/23 |
| 4,483,433 | 11/1984 | Fischer et al. | 198/339 |
| 4,553,319 | 11/1985 | Fischer et al. | 29/596 |
| 4,679,312 | 7/1987 | Nussbaumer et al. | 29/596 |
| 4,732,338 | 3/1988 | Eminger et al. | 242/1.1 R |
| 4,762,283 | 8/1988 | Sabatino | 242/1.1 R |
| 4,844,356 | 7/1989 | Koizumi | 242/1.1 R |
| 4,913,362 | 4/1990 | Koizumi | 242/1.1 R |
| 4,946,111 | 8/1990 | Luciani . | |
| 4,951,379 | 8/1990 | Clemenz | 29/597 |
| 4,969,606 | 11/1990 | Santandrea et al. | 242/1.1 R |
| 4,982,908 | 1/1991 | Luciani | 242/1.1 R |
| 4,997,138 | 3/1991 | Luciani et al. | 242/7.03 |
| 5,149,000 | 9/1992 | Santandrea et al. . | |
| 5,207,745 | 5/1993 | Santandrea | 242/1.1 R |
| 5,316,228 | 5/1994 | Santandrea et al. . | |
| 5,370,324 | 12/1994 | Beakes et al. | 242/1.1 R |
| 5,372,319 | 12/1994 | Dolgas | 242/7.05 B |
| 5,383,618 | 1/1995 | Santandrea et al. . | |

FOREIGN PATENT DOCUMENTS

| | | |
|---|---|---|
| 0331906 | 2/1989 | European Pat. Off. . |
| 9130874 | 6/1993 | European Pat. Off. . |

OTHER PUBLICATIONS

The Globe Tool and Engineering Company Drawing No. E–X69039 Dated Feb. 26, 1984 Showing Prior Art Machine.
Brochure "Globe MDF 6000" Published 1985 by the Globe Doland Engineering Co. Dayton, OH.
Page from brochure titled "Globe Automated Stator Assembly" showing HSWTC–3100 published 1986 by Statomat-Globe, Inc., front and back cover pages included.
Two Photographs of Prior Art Machine.
Video Recording Alleged by Axis S.p.A., Florence, Italy, to have been made available to customers in 1986 and showing a machine alleged to have been sold in 1986.
Front & Rear Covers, title page, pp. 22–24, and a company address page of brochure titled "Our World Revolves Round Electricity" published by Milafil AG, 1986.
Affidavit by Axis S.p.A. employee regarding Video Recording Alleged by Axis S.p.A. to show prior art machine, Feb. 1996.

*Primary Examiner*—Katherine Matecki
*Attorney, Agent, or Firm*—Roger S. Dybvig

[57] ABSTRACT

A stator winding machine has a turret plate mounted for rotation about a vertical axis with stator clamp mechanisms mounted at spaced locations around its periphery for clamping stators to the turret plate with the axes of the stators coplanar with the axis of reciprocation and oscillation of the winding shuttle used to wind coils on the stators. The turret plate is repeatedly indexed in one direction about its vertical center axis to repeatedly sequentially move each of the stator clamp mechanism to a load/unload station, an optional idle station, a winding station, a coil lead terminating station, and then back to the load/unload station. Parts of the machine are quickly replaceable and other parts are programmably adjustable to accommodate different stator configurations.

21 Claims, 7 Drawing Sheets

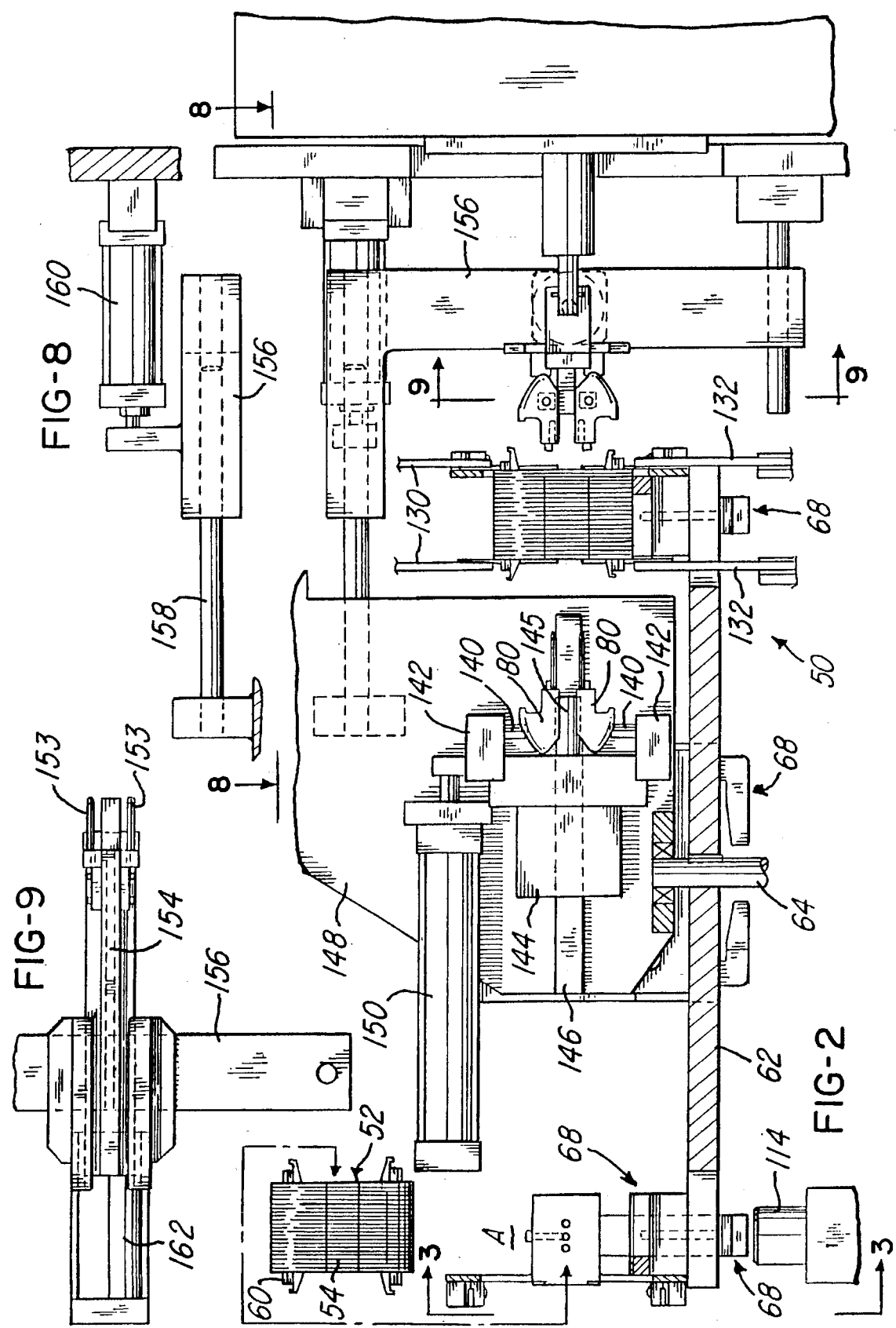

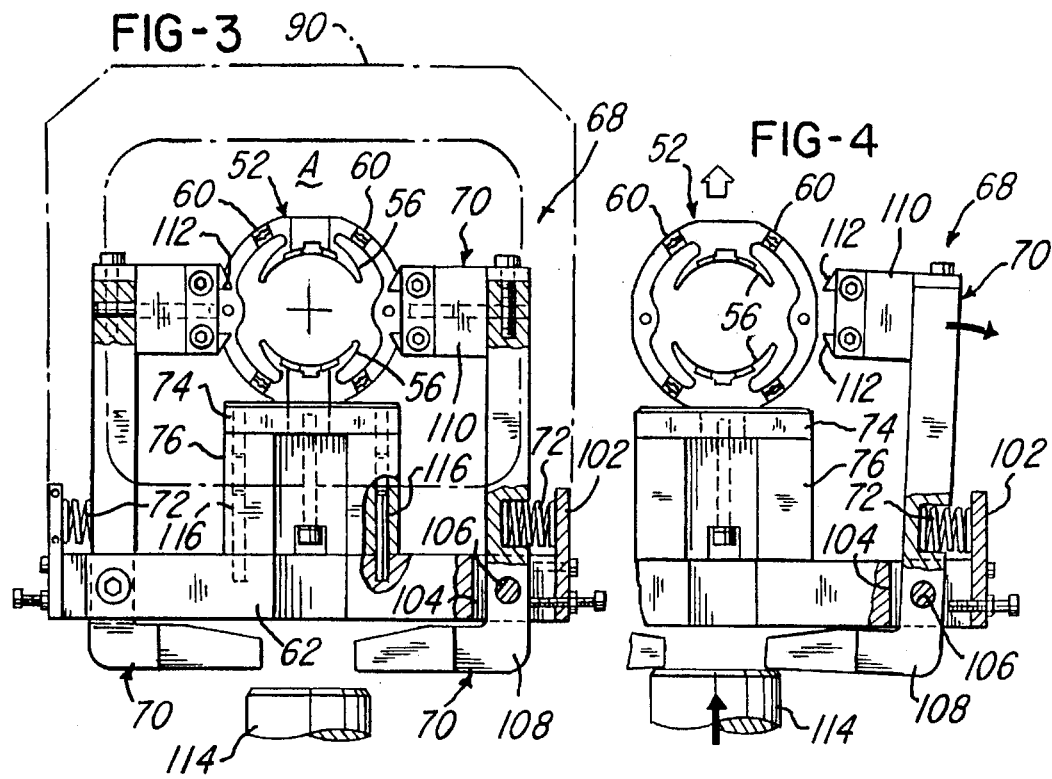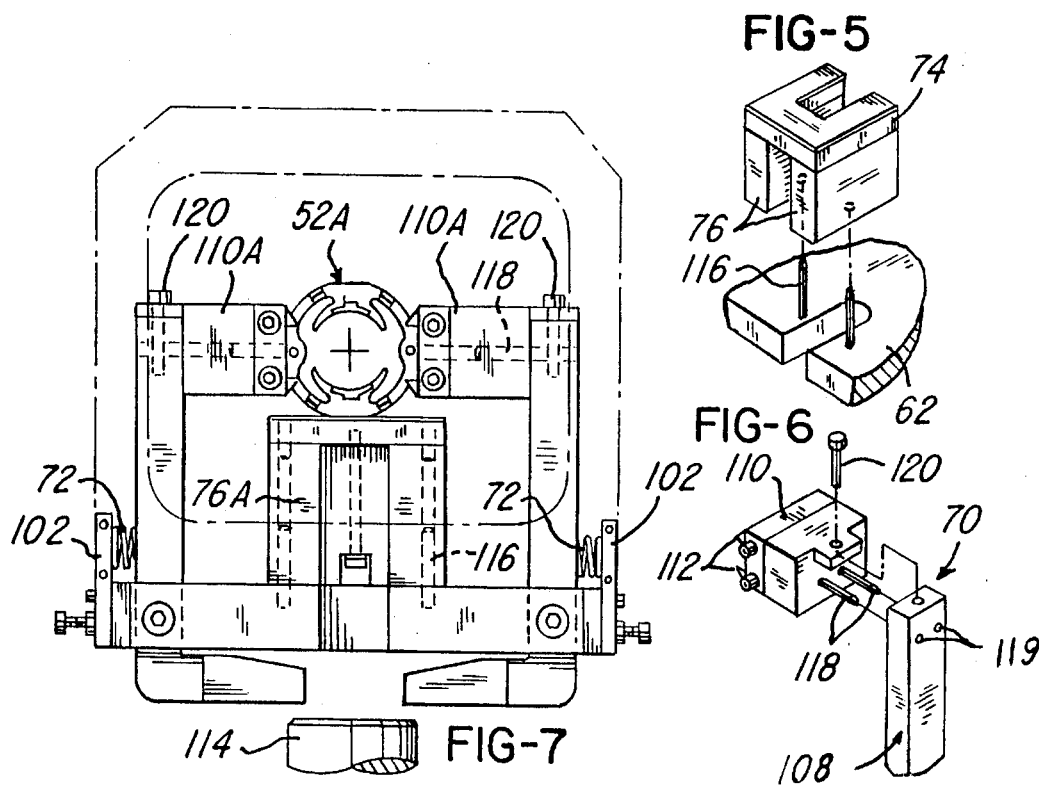

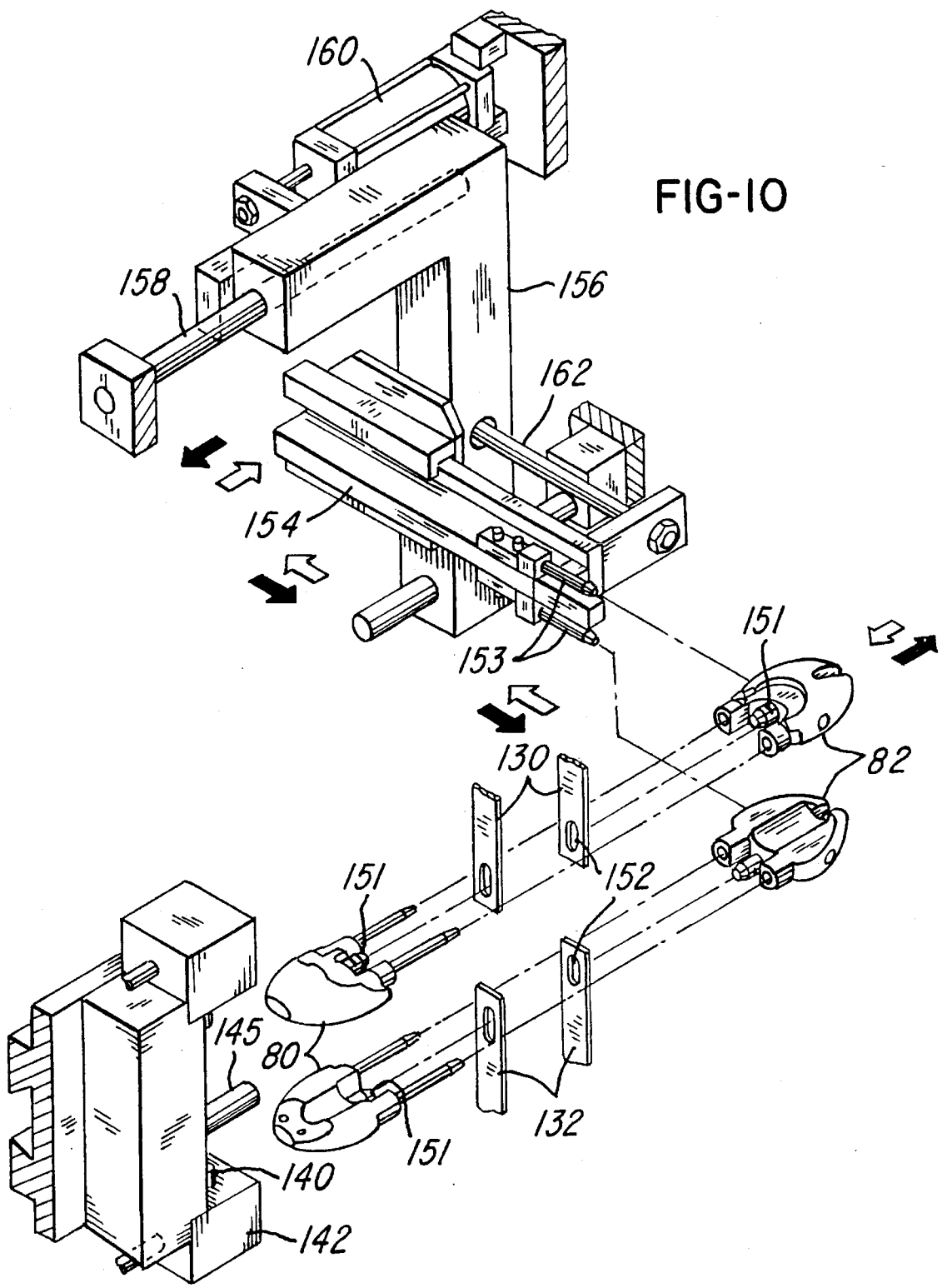

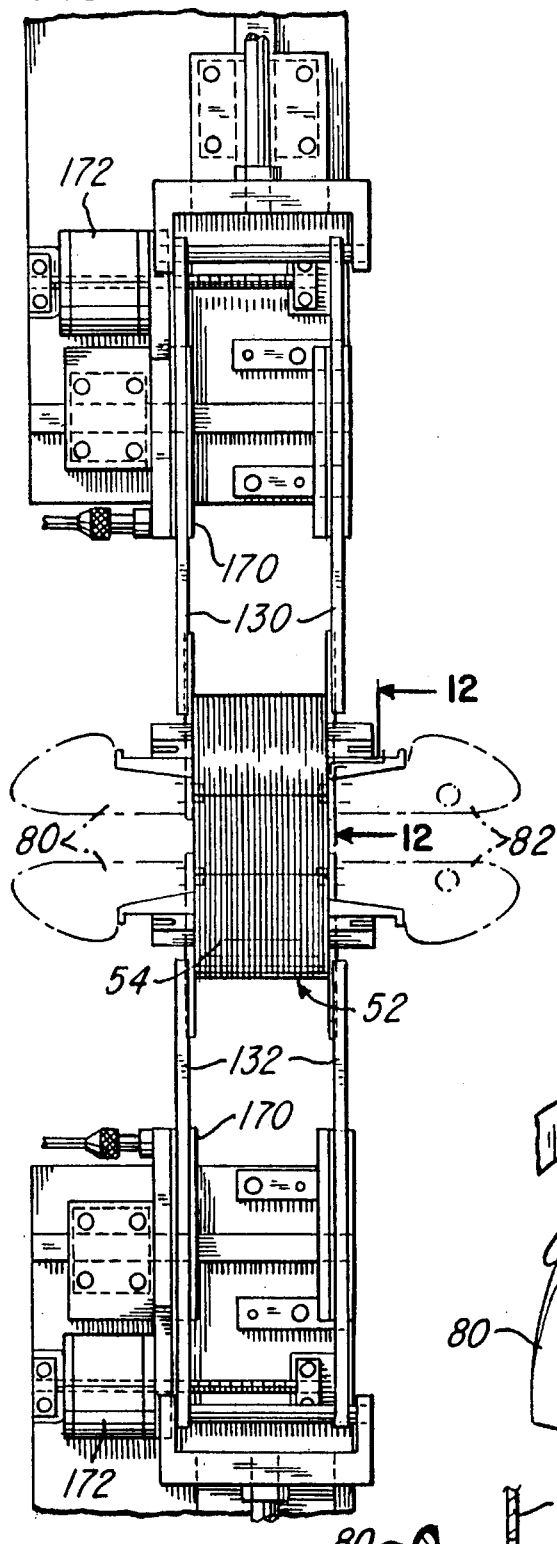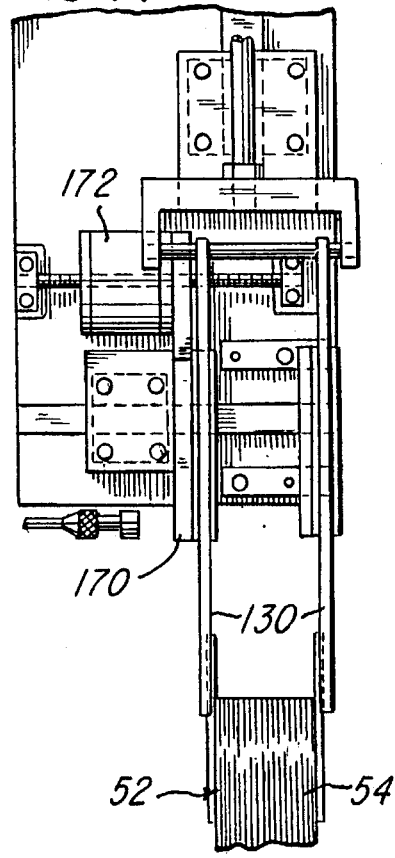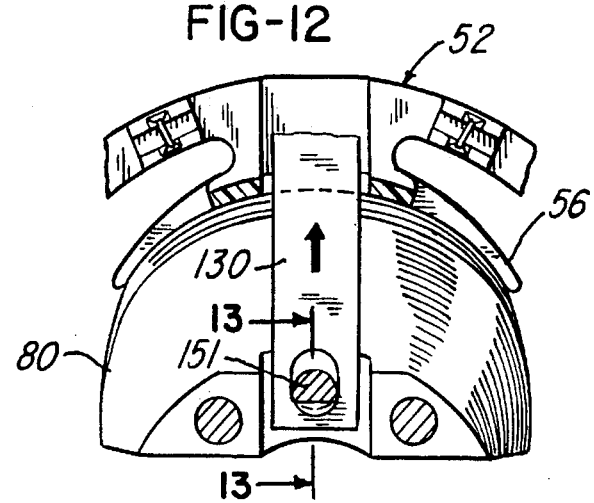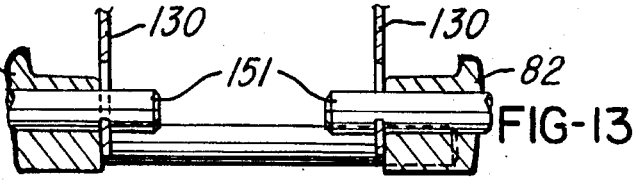

STATOR WINDING APPARATUS

CROSS-REFERENCE TO RELATED APPLICATIONS

This application is a divisional of application Ser. No. 08/148,175, filed on Nov. 5, 1993, now U.S. Pat. No. 5,370,324, which was a continuation of application Ser. No. 07/587,937, filed Sep. 25, 1990, now abandoned.

BACKGROUND OF THE INVENTION

This invention relates to a stator winding apparatus and particularly to a machine for winding field coils on dynamo-electric devices and particularly 2-pole stators and for effecting a connection between the field coils and terminals mounted on the stator.

An object of this invention is to provide a machine which has a high production rate, which is readily adaptable for use with industrial robots and conveyors that convey stators to and from the machine, and is readily changed over, by the use of both programmably adjustable parts and readily replaceable parts, from the winding of a stator of one configuration to the winding of stators having different configurations.

In accordance with this invention, a stator winding machine is provided having a turret plate mounted for rotation about a vertical axis extending centrally therethrough, and plural stator clamp mechanisms mounted at spaced locations around the periphery of the turret plate, each of which mechanisms clamps a stator to the turret plate. For reasons which will become apparent, each stator is clamped to the turret plate with its center axis extending horizontally and substantially perpendicularly with respect to the vertical axis of rotation of the turret plate and with the end face of the stator most remote from the vertical axis of the turret plate held in a vertical orientation spaced a fixed horizontal distance from such vertical axis. The stator is positioned on a seat adjacent each of the clamp mechanisms which may include a replaceable spacer for positioning the clamped stators at a proper height.

A wire clamp assembly is mounted on the turret plate adjacent each of the stator clamp mechanisms. Each wire clamp assembly preferably has programmable, air operated wire clamps adapted to temporarily hold coil lead wires extending from coils wound on a stator being wound.

The turret plate is repeatedly indexed in one direction about its vertical center axis to repeatedly sequentially move each of the stator clamp mechanisms to a load/unload station, a winding station, a coil lead terminating station, and then back to the load/unload station. In the presently preferred embodiment, the turret has four stator clamp mechanisms, located 90 degrees apart around the periphery of the turret plate, one for each of the above-mentioned stations and an additional one which is accommodated by an idle station between the load/unload stations and the winding station.

At the load/unload station, a newly wound stator is removed from the turret plate and replaced by an unwound stator. Subsequently, the unwound stator is moved by an index of the turret plate to the winding station. Located adjacent the winding station is a winding head having a winding shuttle or ram that reciprocates and oscillates about a fixed horizontal axis to draw two or more wires from sources of wire under tension to wind the wires into coils about the stator poles. In advance of the operation of the winding head, two pairs of winding forms are connected to the unwound stator at the winding station, and a pair of wires extending from the wire sources and held by wire grippers are inserted by movement of the wire gripers into a pair of the wire clamps supported on the turret plate. Coils of wire are then wound on the unwound stator by operation of the winding head. At the conclusion of the winding operation, the wire portions leading from the coils to the winding shuttle are gripped by the wire grippers to form coil finish lead wires extending from the coils, which are positioned in other wire clamps on the turret plate. Wire cutting mechanisms associated with the wire grippers cut the finish leads, now clamped to the turret plate, free from wire grippers so that the newly wound stator is completely severed from the winding head. The stator may then be indexed by rotation of the turret plate to the wire terminating station at which the start and finish leads are removed from the wire clamps and at least temporarily connected to terminals on the station by a robot or other suitable mechanism. Accordingly, when the newly wound stator arrives at the load/unload station, it may be simply unclamped from the turret plate and removed. The foregoing operations are repeated to continuously wind stators.

Preferably in accordance with this invention, the stator clamp mechanisms and the stator seats and spaces are quickly replaceable to accommodate stators having different stack diameters, the wire grippers form parts of a winding form handling and locking mechanism are capable of accommodating stators having different stack heights, the winding head is programmably movable for accommodating stators having different stack heights, and the wire grippers for part of a lead pull assembly which is programmable to accommodate different requirements for stator coil leads, both as to the position of the wire clamps for the start and finish wires and also as to any clamps that may be provided for coil tap leads.

Other objects and advantages will become apparent from the following description and the drawings.

BRIEF DESCRIPTION OF THE DRAWINGS

FIG. 2 is a simplified, fragmentary, front elevational view of the machine of FIG. 1 and showing an unwound stator in position to have coils wound therein and another unwound stator about to be clamped to the machine turret plate.

FIG. 3 is a fragmentary elevational view, with parts broken away and parts shown in cross section, of a stator support and clamp assembly forming part of the machine of FIG. 1 as viewed in the direction of arrows 3—3 of FIG. 2 and showing a wire clamp support holder associated therewith by broken lines.

FIG. 4 is a fragmentary elevational view, with parts broken away and parts shown in cross section, of a portion of the stator support and clamp assembly of FIG. 3.

FIG. 5 is a fragmentary, exploded perspective view of a portion of a stator support forming part of the support and clamp assembly of FIGS. 3 and 4.

FIG. 6 is a fragmentary, exploded perspective view of a portion of a stator clamp forming part of the support and clamp assembly of FIGS. 3 and 4.

FIG. 7 is a view similar to FIG. 3 showing the stator support and clamp assembly modified to support a stator of a different size.

FIG. 8 is a fragmentary top plan view, partly in cross-section, of a portion of a winding form-loading mechanism of the machine of FIGS. 1 and 2 as viewed in the direction of arrows 8—8 of FIG. 2.

FIG. 9 is a fragmentary elevational view of another portion of the winding form-loading mechanism of the machine of FIGS. 1 and 2 as viewed in the direction of arrows 9—9 of FIG. 2.

FIG. 10 is a simplified, fragmentary, exploded, perspective view that diagrammatically illustrates the movements of the various parts of the winding form-loading mechanism. The stator is not shown in FIG. 10 to avoid a confusion of lines.

FIG. 11 is a fragmentary, elevational view of a stator located in position to be wound and showing winding forms locked to the stator by upper and lower programmably adjustable form lock assemblies in accordance with this invention.

FIG. 12 is an enlarged, fragmentary cross sectional view taken along section line 12—12 of FIG. 11, with parts cut away, showing the manner in which a winding form is locked to a stator.

FIG. 13 is a fragmentary cross sectional view taken along section line 13—13 of FIG. 12 and on the same scale as FIG. 12.

FIG. 14 is a simplified, fragmentary, elevational view showing the upper form locking assembly adjusted for use with a stator having a different stack height.

DETAILED DESCRIPTION

Figure 1:
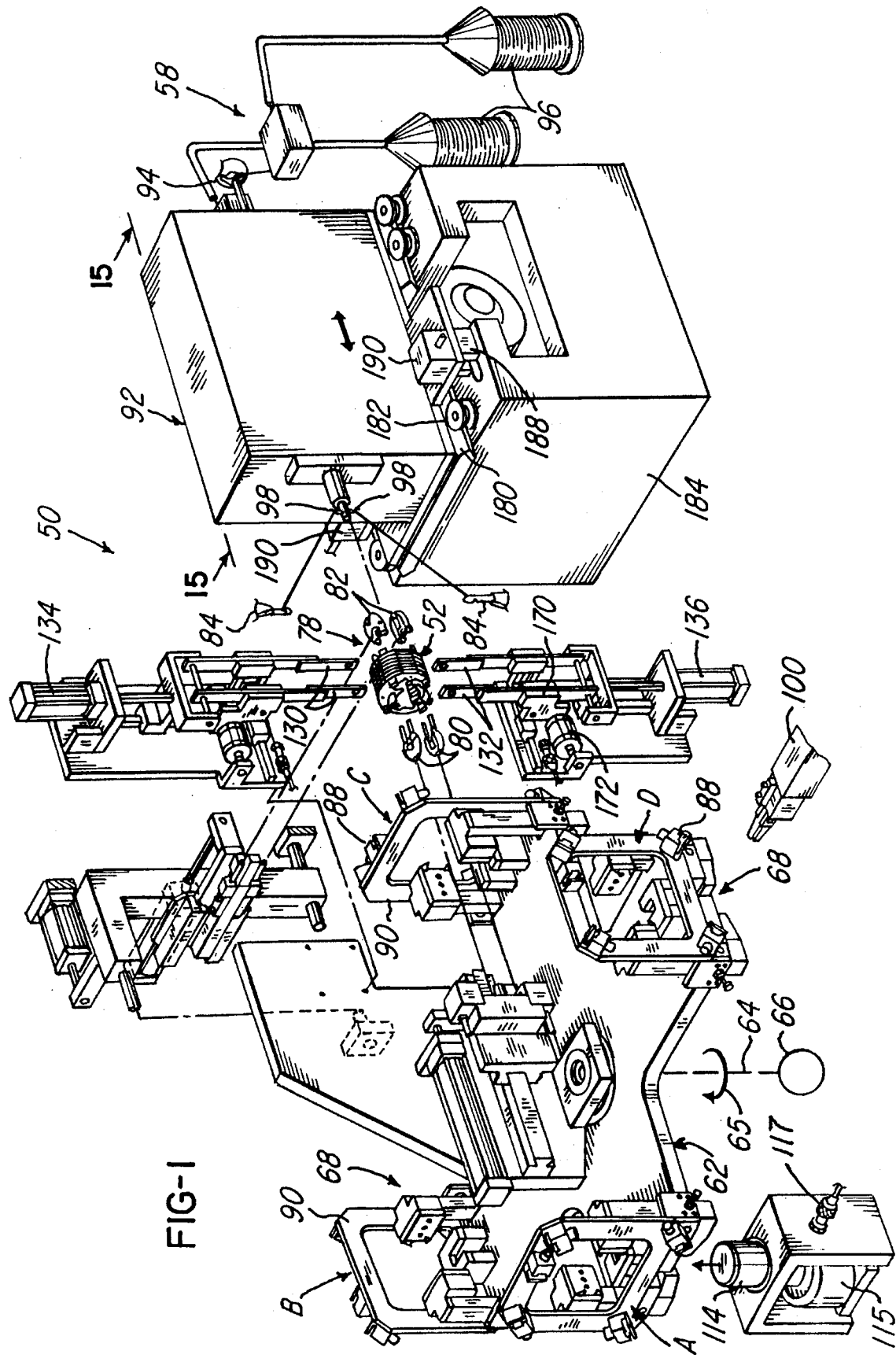
FIG. 1 is a simplified, exploded, partly diagrammatic perspective view of a stator winding machine in accordance with this invention.

FIGS. 1 and 2 illustrate a stator winding machine, generally designated 50, in accordance with this invention for use in winding coils of wire onto a 2-pole stator, generally designated 52, comprising a generally cylindrical laminated core 54 that forms pole pieces 56 about which the coils are wound from wires drawn from sources 58 of wire under tension. Here it may be observed that the length of a stator is known as its "stack height" since its length is determined by the number and thickness of the laminations from which it is formed. Its outer diameter is termed its "stack diameter". The stator 52 is also provided with terminal boards, which may be entirely conventional, and terminals 60 held by the boards to which the stator coil lead wires are connected.

In general, the purpose of the stator winding machine 50 is to wind field coils onto the stator pole pieces 56 and to at least temporarily connect the coil lead wires to the terminals on the stator.

With continued reference to FIGS. 1 and 2, the machine 50 includes a turret plate 62 mounted for rotation about a vertical axis 64 and repeatedly rotationally indexed through successive 90 degree increments in one direction, as indicated by the arrow 65 in FIG. 1, about its vertical axis 64 by a suitable indexing drive motor 66. Stators to be wound are clamped to an individual one of four stator clamp mechanism, generally designated 68, each of which includes a pair of mutually confronting stator clamps, generally designated 70, pivotally mounted on the periphery of the turret plate 62 and biased by springs 72 into clamping engagement with the stators clamped thereby. The stators are supported by seats 74 located around the periphery of the turret plate 62. Spacers 76 to which the seats 74 are connected in any suitable fashion are provided, if needed, to locate the stators at the proper height with the longitudinal axis of the stator coplanar with the horizontal axis of movement of the winding shuttle, as will become apparent.

The four stator clamp mechanism 68 are connected to the turret plate 62 at 90 degree spaced locations so that, in operation, after each 90 degree index of the turret plate 62, there will be a clamp mechanism 68 at each of four stations, namely a load/unload station A, an idle stations B, a winding station C, and a coil lead terminating station D. At each of the stations, the stators are positioned with their center axes extending horizontally and substantially perpendicularly with respect to the vertical axis 64 of the turret plate 62 and with the end faces of the stators most remote from the vertical axis 64 in vertical orientations and spaced a fixed horizontal distance from the vertical axis 64 of the turret plate 62.

At the load/unload station A, a newly wound stator 52 is unclamped from the turret plate 62, removed from the turret plate 62, and replaced by an unwound stator 52. No operations are performed on the stator at the idle station B. At the winding station C, two pairs of winding forms 78, namely a pair of upper and lower front winding forms 80 and a pair of upper and lower rear winding forms 82, are connected to the unwound stator 52, and wire portions held by an upper and lower pair of wire grippers 84 are inserted by movement of the wire grippers 84 into a pair of the wire clamps 88 supported on the turret plate 62 by a mounting frame plate 90, as will be further described below.

After the foregoing steps are accomplished, a pair of stator coils are wound by the operation of a winding head 92 located adjacent the winding station C and having a reciprocating and oscillating shuttle or ram 94 that draws wires from sources 96 of wire under tension and having wire guide needles 98 through which the wires exit as the coils are wound. The operating mechanism within the winding head may be entirely conventional so it is not described in detail herein, its importance being that it causes the winding shuttle or ram 94 to reciprocate and oscillate about a fixed horizontal axis in order to wind coils of wire around the stator pole pieces in a manner well known in the art.

At the conclusion of the winding operation, the wire portions leading from the coils to the winding shuttle 94 are gripped by the wire grippers 84 to form coil finish lead wires extending from the coils, which are positioned in other ones of the wire clamps 88. Wire cutting mechanism associated with the wire grippers 84 cut the finish leads free from the wire grippers so that the newly wound stator is completely free from the winding head shuttle 94 so that it may be indexed by rotation of the turret plate 62 to the wire terminating station D at which the start and finish leads are removed from the wire clamps 88 and at least temporarily connected to terminals on the stator by a robot or other suitable mechanism, diagrammatically indicated at 100. This mechanism may also be conventional and is not further described herein. One example of a coil terminating mechanism is shown in U.S. Pat. No. 4,951,379. Thus it may be seen that when the newly wound stator returns to the load/unload station A, it may be simply unclamped from the turret plate and removed. The foregoing operations are repeated to continuously wind stators.

With reference to FIGS. 1 through 6, each clamp mounting plate 90 comprises a rectangular plate connected to a pair of spring retainer plates 102, each of which is mounted on the turret plate 62 over a recess 104 therein which is spanned by a pivot pin 106 for an L-shaped clamp lever 108 that forms part of one of the stator clamps 70. Each clamp 70 further includes a clamp jaw 110 removably connected to the clamp lever 108 shaped to engage the outer periphery of the stator. Each clamp jaw 110 has a pair of protuberant teeth 112 having vertical surfaces which provide reference points or backup surfaces engaged by the face of the stator most remote from the vertical axis 64 to insure that the stator is properly spaced from the operating mechanisms at the various stations. The stator may be so positioned by hand or by the use of a suitable mechanism, such as an industrial robot (not shown). To enable the stator to be inserted and removed through the clamp mounting plate 90 at the load/unload station A, the clamp jaws are spread apart by engagement of the piston 114 of an air cylinder 115 with the lower leg of the L-shaped clamp lever 108, as apparent from an inspection of FIGS. 1–3. A sensing switch 117 (FIG. 1) indicates to the machine controls that it is safe to index. The operations of this and various other sensing devices are not described herein, the use of such devices in the control of machine operations being well known.

As seen in FIGS. 5 and 6, the assembled seats 74 and spacers 76 and the stator clamp jaws 110 are readily removable and replaceable for use in supporting stators having different stack diameters. Thus, an assembled seat 74 and spacer 76 can simply be lifted off the turret plate 62, it being held only by a pair of pins 116 on the turret. The stator clamp jaw 110 shown in FIG. 6, being aligned with the lamp lever 108 by a pair of pins 118 projecting from the clamp jaw 110 which are received by bores 119 in the clamp lever 108, is similarly slidable off the clamp lever 108 following removal of a retaining pin 120. The advantage of these quick-change parts can be observed by a comparison of FIGS. 3 and 7. Thus, FIG. 3, shows a relatively larger stator 52 and FIG. 7 shows a relatively smaller stator, designated 52A. FIG. 7 accordingly has a correspondingly taller spacer, designated 76A, and longer clamp jaws, designated 110A. It will be noted in FIGS. 3 and 7 that the stators are located on the same center line.

The winding of an unwound stator 52 commences with placement of the stator on the seat 74 located at the load/unload station A. This places the stator in a proper rotational orientation for further processing in view of the fact that the stator has a flat surface which rests on the seat 74. Of course, other means of stator orientation could be used. After the second subsequent index of the turret plate 62, the unwound stator arrives at the winding station C with its center line aligned with the fixed axis of reciprocation and oscillation of the winding shuttle 94. At this time the winding forms 80 and 82 are locked to one another and to the stator core 54 in an essentially conventional fashion. Thus, an upper pair of form retainer blades 130 are moved downwardly and a lower pair of form retainer blades 132 are moved upwardly by the operation of air actuators 134 and 136, respectively, into straddling relation to the stator core 54. It is appropriate to note at this time that the stator seat 74 and its spacer 76 are shaped to permit the extension of the lower form retainer blades therethrough or therepast.

With reference to FIGS. 2 and 10, the front pair of winding forms 80 are initially held between short piston rods 140 controlled by air cylinders 142 mounted on a carriage 144 and a center post 145 on the carriage 144. The carriage 144 is slidably guided along a gib 146 mounted on a mounting plate 148 affixed to the bed of the machine. The carriage 144 is movable toward and away from the stator at the winding station C by operation of an air actuator 150 that is also mounted on the fixed mounting plate 148. Advancement of the carriage 144 toward the stator causes the front winding forms to engage the front face of the stator core at which time a locking pin 151 on the front winding forms 80 pass through slots 152 in the form retainer blades 130 and 132. The rear pair of winding forms 82 is then advanced toward the stator and interengages with the front winding forms 80 and 82 to the stator core 54 by engagement with the locking pins, as is well known.

The parts that carry the winding forms 80 and 82 to the stator are now moved away to enable the coil lead connection and the coil winding operations to commence. The carriage 144 for the front winding forms is simply retracted out of the way by operation of the air actuator 150. With reference to FIGS. 8, 9, and 10, the rear winding forms are carried by support pins 153 mounted on a pin carriage 154 movably mounted on an L-shaped bracket 156 slidable on guide rod 158 in a direction generally parallel to the stator axis and moved therealong by an actuator 160. The pin carriage 154 is driven relative to the bracket 156 by an air actuator 162 thereon. In operation, the support pins 153 are advanced to bring the rear winding forms toward the stator by operations of the air actuator 160. After the forms are locked to the stator, the pin carriage is retracted to the side by operation of the air actuator 162 and then rearwardly by operation of the air actuator 160 where the parts are out of the way to permit the coil lead handling and winding operations to take place. The operations to remove the winding forms 80 and 82 after the winding operation is completed will be obvious from the foregoing.

With reference to FIGS. 1, 11, and 14, further in accordance with this invention, the frontmost ones of the upper and lower form locking blades 130 and 132 are mounted on movable carriages 170 driven by motors 172 that enable them to be programmably adjusted for use with stators having different stack heights. Of course, the positions of the rear locking blades are fixed because the corresponding face of the stator is always located in the same vertical plane regardless of the stator stack height.

Figure 15:
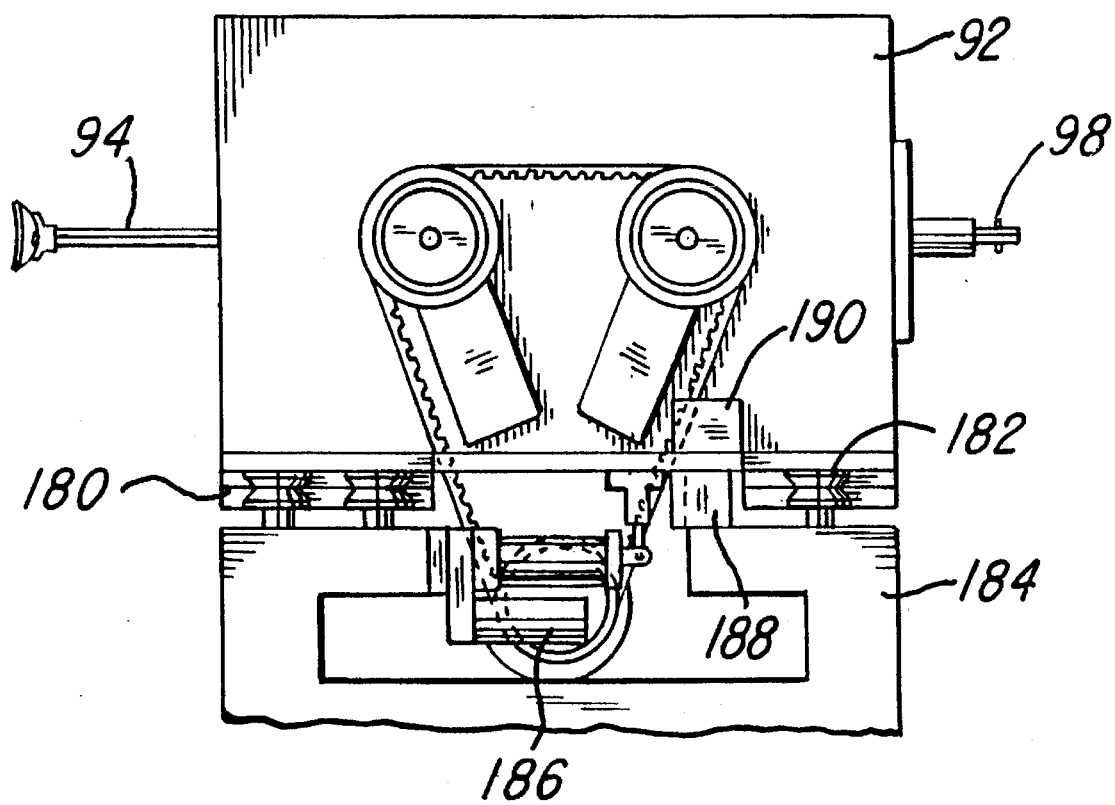
FIG. 15 is a fragmentary, rear elevation view of the programmably adjustable winding head assembly of this invention, representing the portion of the machine viewed in the direction of arrows 15—15 of FIG. 1.
Figure 16:
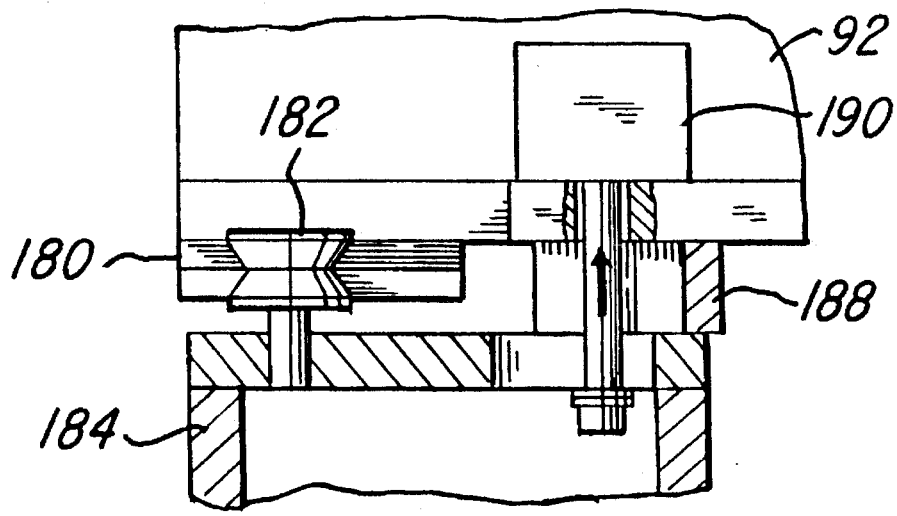
FIG. 16 is an enlarged, fragmentary elevational view showing the manner in which a winding head is clamped to its base.
Figure 17:
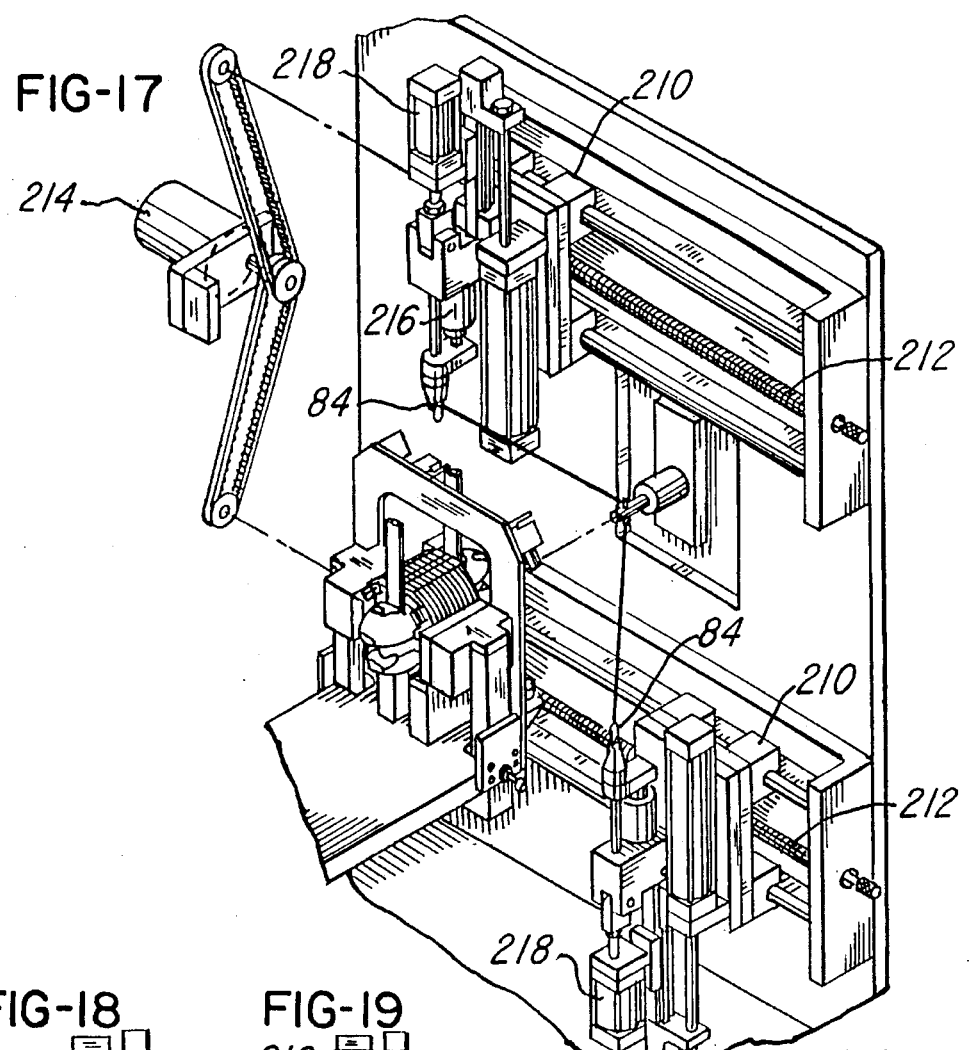
FIG. 17 is a fragmentary perspective view of a programmably adjustable lead pull assembly forming part of the machine of FIGS. 1 and 2. A small portion of this assembly is shown diagrammatically in FIG. 1 and is not shown in FIG. 2 to avoid overcrowding of lines.
Figure 18:
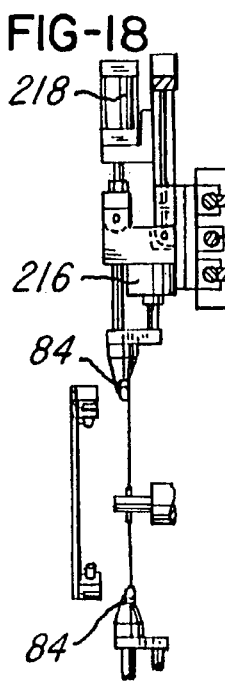
FIGS. 18 through 22 diagrammatically illustrate the initial and final steps in the sequence of operation of the programmably adjustable lead pull assembly of FIG. 17.
Figure 19:
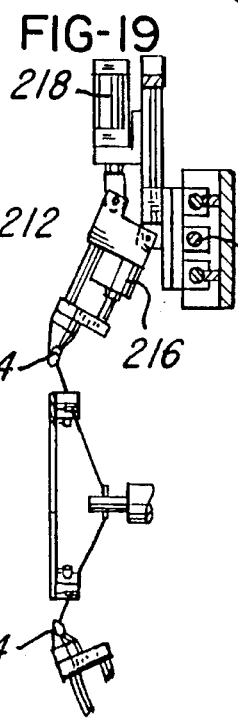
Figure 20:
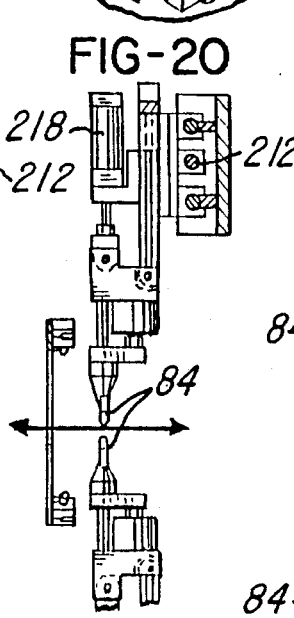
Figure 21:
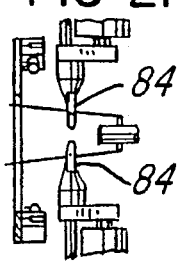
Figure 22:
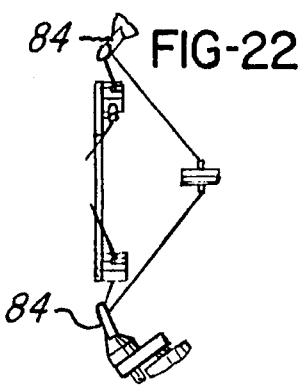

With reference to FIGS. 1, 15, and 16, also for purposes of adjusting to stators having different stack heights, the winding head 92 has tracks 180 supported by roller elements 182 on a winding machine base 184. The entire winding head 92 may be moved toward and away from the stator, to advantageously adjust the center of the shuttle reciprocation to the center of the stator by means of a suitable drive unit 186. During the movement of the winding head 92, it also slides along a brass clutch member 188 shown in FIG. 16. To clamp the winding head in an adjusted location, a pair of air operated clamps 190 draw the winding head 92 and its base 184 together. The operating parts for moving and clamping the winding head 92 may also be programmably controlled for purposes of quick change over.

FIGS. 17 through 22 illustrate how the wire grippers 84 may be programmably controlled for winding stators having various different lead positioning requirements. There it will be noted that the wire grippers 84 are mounted on movable carriages 210 that are driven by screws 212 rotated by a motor 214 by which carriages 210 are moved in opposite directions along the screws 212. Air actuators 216 and 218 on the carriages 210 are used to control the various movements of the lead pulls as illustrated in FIGS. 18 through 21. As known, cutting blades (not shown) mounted on the wire grippers 84 are used to sever the wire segments between the lead wire grippers 84 and the wound stator at the completion of the winding operation.

Although the presently preferred embodiments of this invention have been described, it will be understood that within the purview of the invention various changes may be made within the scope of the following claims.

Having thus described our invention, we claim:

1. Stator winding apparatus for winding field coils onto pole pieces of a stator located at a winding station using wires supplied from sources of wire under tension, said apparatus comprising:

a turret plate mounted for rotation about a vertical axis;

at least three stator clamp mechanisms including stator clamps mounted on said turret plate at spaced locations around its periphery for clamping stators to said turret plate at said spaced locations with the center axes of said stators extending horizontally and substantially perpendicularly with respect to said vertical axis and with the end faces of said stators most remote from said vertical axis held by said stator clamps in vertical orientations and spaced a fixed horizontal distance from said vertical axis;

a wire clamp assembly mounted on said turret plate adjacent each of said stator clamp assemblies having wire clamps adapted to temporarily hold coil lead wires extending from coils wound on a stator;

means for repeatedly indexing said turret plate in one direction about said vertical axis to repeatedly sequentially position each of said stators in a load/unload station wherein a newly wound stator is unclamped from said turret plate and removed from said turret plate and replaced by an unwound stator, a winding station at which coils of wire are wound on an unwound stator and coil lead wires extending from said coils are positioned in said wire clamps and severed from the wire sources, and a coil lead terminating station wherein the coil lead wires are connected to terminals mounted on the core of the newly wound stator;

a winding head assembly that winds coils of wire on the stator located at said winding station, said winding head assembly being located adjacent said winding station;

two pairs of winding forms for guiding the wires wound into coils wound on the stator at the winding station;

a pair of winding form-loading mechanisms that move said winding forms toward and away from one another at said winding station;

a pair of programmably adjustable form lock assemblies adjacent said winding station that lock said winding forms to the stator located at said winding station and, after the winding operation is completed, unlock said winding forms from the same stator while said stator is still located at said winding station; and coil lead terminating means at said coil lead terminating station for connecting said coil lead wires to said terminals on said stator core.

2. The apparatus of claim 1 wherein said winding head assembly comprises a winding head having a ram that reciprocates and oscillates about a fixed horizontal axis, said winding head assembly further including a base, means for supporting said winding head on said base for movement back and forth along said fixed horizontal axis, means for moving said winding head along said fixed horizontal axis, and means for clamping said winding head to said base to prevent movement thereof.

3. The apparatus of claim 1 wherein said winding head has a ram that reciprocates and oscillates about a fixed horizontal axis, and wherein said turret plate is provided with seats for supporting said stators so that the center lines of said stators are coplanar with said fixed horizontal axis.

4. The apparatus of claim 3 wherein said seats are connected to spacers, said seats and spacers being readily removed and replaced by seats and spacers of different heights to accommodate stators of different stack diameters.

5. The apparatus of claim 3 wherein said form lock assemblies include form retainer blades engaging said winding forms and holding them against a stator in said winding station and means for moving said blades in vertical paths toward and away from said winding forms, and wherein said seats and said spacers have openings to permit movement of said form retainer blades therethrough.

6. The apparatus of claim 1 wherein each of said pair of programmably adjustable form lock assemblies comprises a pair of parallel, vertically movable form locking blades, a movable carriage, means mounting one of said form locking blades on said carriage, and a motor for moving said carriage and thereby said one of said form locking blades horizontally toward and away from the other of said form locking blades.

7. The apparatus of claim 1 wherein one of said pair of winding form-loading mechanisms comprises a carriage movable toward and away from said winding station, a horizontal post extending from said carriage toward said winding head, clamp means mounted on said carriage for releasably clamping a pair of said winding forms to said horizontal post, and means for moving said carriage with said winding forms clamped thereto toward said winding head and positioning said clamped winding forms in the bore of a stator to be wound.

8. The apparatus of claim 7 wherein said clamp means comprises a pair of air actuators having piston rods engageable with said clamped winding forms.

9. The apparatus of claim 1 further comprising a lead pull assembly adjacent said winding station for positioning wires extending to and from the coils wound at said winding station in said wire clamps, said lead pull assembly including first and second wire gripper assemblies and a pair of drive screws, one for each of said wire gripper assemblies, drivingly connected to said wire gripper assemblies for moving said wire gripper assemblies in horizontal directions; and said lead pull assembly further including a programmably controllable drive motor connected to said drive screws for rotating the same.

10. The apparatus of claim 9 wherein said drive motor is connected to said drive screws by means causing said carriages to move in mutually opposite directions.

11. Stator winding apparatus for winding field coils onto pole pieces of a stator located at a winding station using wires supplied from sources of wire under tension, said apparatus comprising:

a winding head assembly that winds coils of wire on the stator located at said winding station, said winding head assembly being located adjacent said winding station;

two pairs of winding forms for guiding the wires wound into coils wound on the stator at the winding station;

a pair of winding form-loading mechanisms that move said winding forms toward and away from one another at said winding station; and a pair of programmably adjustable form lock assemblies adjacent said winding station that lock said winding forms to the stator located at said winding station and, after the winding operation is completed, unlock said winding forms from the same stator while said stator is still located at said winding station.

12. The apparatus of claim 11 wherein each of said pair of programmably adjustable form lock assemblies comprises a pair of parallel, vertically movable form locking blades adapted to straddle a stator at said winding station, a movable carriage, means mounting one of said form locking blades on said carriage, and a motor for moving said carriage and thereby said one of said form locking blades horizontally toward and away from the other of said form locking blades.

13. A stator winding apparatus for winding field coils onto pole pieces of a stator located at a winding station using wires supplied from sources of wire under tension, said apparatus comprising:

a winding head assembly that winds coils of wire on the stator located at said winding station, said winding head assembly being located adjacent said winding station;

two pairs of winding forms for guiding the wires wound into coils wound on the stator at the winding station;

a pair of winding form-loading mechanisms that move said winding forms toward and away from one another at said winding station, one of said pair of winding form-loading mechanisms comprising a carriage mounted for movement toward and away from said winding station, a horizontal post extending from said carriage toward said winding head, clamp means mounted on said carriage for releasably clamping a pair of said winding forms to said horizontal post, and means for moving said carriage with said winding forms clamped thereto toward said winding head and positioning said clamped winding forms in the bore of a stator to be wound; and a pair of form lock assemblies adjacent said winding station that lock said winding forms to the stator located at said winding station and, after the winding operation is completed, unlock said winding forms from the same stator while said stator is still located at said winding station.

14. The apparatus of claim 13 wherein said clamp means comprises a pair of air actuators having piston rods engageable with said clamped winding forms.

15. Stator winding apparatus for winding field coils onto pole pieces of a stator located at a winding station using wires supplied from sources of wire under tension, said apparatus comprising:

a turret plate mounted for rotation about a vertical axis;

plural stator clamp mechanisms including stator clamps mounted on said turret plate at spaced locations around its periphery for clamping stators to said turret plate at said spaced locations with the center axes of said stators extending horizontally and substantially perpendicularly with respect to said vertical axis and with the end faces of said stators most remote from said vertical axis held by said stator clamps in vertical orientations and spaced a fixed horizontal distance from said vertical axis;

means for repeatedly indexing said turret plate about said vertical axis to repeatedly sequentially position each of said stators in a load/unload station wherein a newly wound stator is unclamped from said turret plate and removed from said turret plate and replaced by an unwound stator and a winding station at which coils of wire are wound on an unwound stator, coil start lead wires leading to said coils are positioned in wire clamps, and coil finish lead wires extending from said coils are positioned in wire clamps and severed from the wire sources;

two pairs of winding forms for guiding the wires wound into coils wound on the stator at the winding station;

a pair of winding form-loading mechanisms that move said winding forms toward and away from one another at said winding station;

a pair of form lock assemblies adjacent said winding station that lock said winding forms to the stator located at said winding station and, after the winding operation is completed, unlock said winding forms from the same stator while said stator is located at said winding station;

a winding head assembly that winds coils of wire on the stator located at said winding station while said winding forms are locked to said stator, said winding head assembly being located adjacent said winding station and having a ram that reciprocates and oscillates about a fixed horizontal axis;

said turret plate having seats for supporting said stators so that the centerlines of said stators are coplanar with said fixed horizontal axis, said seats being connected to spacers, said seats and spacers being readily removed and replaced by seats and spacers of different heights to accommodate stators of different stack diameters.

16. The stator winding apparatus of claim 15 wherein said spacers are connected to said turret by vertically oriented pins on said turret located in bores in said spacers.

17. The stator winding apparatus of claim 15 wherein each of said stator clamp mechanisms comprises a clamp lever pivotally mounted on said turret plate and a stator-engageable clamp jaw mounted on said clamp lever, said clamp jaw being readily removed and replaced by clamp jaws of different dimensions to accommodate stators of different dimensions.

18. The stator winding apparatus of claim 15 wherein each of said stator clamp mechanisms comprises a pair of clamp levers pivotally mounted on said turret plate and a pair of stator-engageable clamp jaws, one for each of said clamp levers, mounted on said clamp levers, said clamp jaws being readily removed and replaced by clamp jaws of different dimensions to accommodate stators of different dimensions.

19. Stator winding apparatus for winding field coils onto pole pieces of a stator located at a winding station using wires supplied from sources of wire under tension, said apparatus comprising:

a turret plate mounted for rotation about a vertical axis;

plural stator clamp mechanisms including stator clamps mounted on said turret plate at spaced locations around its periphery for clamping stators to said turret plate;

means for repeatedly indexing said turret plate about said vertical axis to repeatedly sequentially position each of said stators in a load/unload station wherein a newly wound stator is unclamped from said turret plate and removed from said turret plate and replaced by an unwound stator and a winding station at which coils of wire are wound on an unwound stator, coil start lead wires leading to said coils are positioned in wire clamps, and coil finish lead wires extending from said coils are positioned in wire clamps and severed from the wire sources;

a winding head assembly that winds coils of wire on the stator at said winding station, said winding head assembly being located adjacent said winding station and having a ram that reciprocates and oscillates about a fixed horizontal axis;

a lead pull assembly adjacent said winding station for positioning said coil start and finish lead wires extending, respectively, to and from the coils wound at said winding station in said wire clamps, said lead pull assembly including first and second wire gripper assemblies and a pair of drive screws, one for each of said wire gripper assemblies, drivingly connected to said wire gripper assemblies for moving said wire gripper assemblies in a horizontal direction; and said lead pull assembly further including a programmably controllable drive motor connected to said drive screws for rotating the same.

20. The apparatus of claim 19 wherein said drive motor is connected to said drive screws by means causing said carriages to move in mutually opposite directions.

21. The apparatus of claim 19 wherein a newly wound stator at said winding station is, as a result of an index of said turret plate, moved from said winding station to a coil lead terminating station wherein the coil lead wires are connected to terminals mounted on the core of the newly wound stator and said apparatus further comprises coil lead terminating means at said coil lead terminating station for connecting said coil lead wires to said terminals on said stator core.

* * * * *